United States Patent [19]
Reicks et al.

[11] Patent Number: 5,664,644
[45] Date of Patent: Sep. 9, 1997

[54] ONE-POINT GREASE DISTRIBUTION SYSTEM FOR BELT CONVEYOR IDLERS

[75] Inventors: Allen V. Reicks; Greg N. Flanagan, both of Pella, Iowa

[73] Assignee: Precision, Inc., Pella, Iowa

[21] Appl. No.: 653,020

[22] Filed: May 24, 1996

[51] Int. Cl.$^6$ .................................. B65G 45/04
[52] U.S. Cl. .................. 184/15.1; 198/500; 384/390; 384/474; 384/484
[58] Field of Search ............... 184/5.1, 6, 15.1, 184/105.3; 198/500, 501; 384/390, 474, 484; 277/134, 208, 215, DIG. 8

[56] References Cited

U.S. PATENT DOCUMENTS

| | | | |
|---|---|---|---|
| 3,070,219 | 12/1962 | Donadio | 184/6 |
| 3,198,318 | 8/1965 | Brown . | |
| 3,345,115 | 10/1967 | Olender et al. . | |
| 3,729,204 | 4/1973 | Augustin | 277/134 |
| 3,884,483 | 5/1975 | Fengler et al. | 277/208 |
| 3,984,160 | 10/1976 | Sheldon et al. . | |
| 4,049,328 | 9/1977 | Ouska et al. . | |
| 4,059,180 | 11/1977 | Krivec et al. . | |
| 4,139,203 | 2/1979 | Garrison . | |
| 4,148,386 | 4/1979 | Bradbury . | |
| 4,174,031 | 11/1979 | MacLeod . | |
| 4,577,747 | 3/1986 | Martin . | |
| 4,664,243 | 5/1987 | Martin . | |
| 4,681,215 | 7/1987 | Martin . | |
| 4,919,253 | 4/1990 | Morrison | 198/501 |
| 5,013,053 | 5/1991 | Champlin | 277/215 |

OTHER PUBLICATIONS

Precision Idler Co., "Existing Technology for Greasable Troughing Idlers", dated Jan. 26, 1994, Drawing No. CP-9411 (Engineering Drawing).
Table 3.1: Dimensional Data and Basis for (11A) Rating System-Surface & Table 3.2: Dimensional Data and Basis for (11A) Rating System-Underground—Comparioson of Idlers from Various Manufacturers (no date).
FMC labyrinth type seal for conveyor idler rool (no date).
Goodman Conveyor Co., Feb. 1996, The Goodman Permaseal II non-purgable seal for conveyor idler roll, p. 43.
Continental—H–Plus roll, p. 3 (no date).
Goodman conveyor Co., Permaseal II Idler Seal (no date).
Hewitt–Robins, Labyrinth type seal for conveyor idler roll (no date).
Goodman Conveyor Company, Inc., Permaseal II—CEMA C, D, & E Series (roll design) (2 Pages) (no date).
Transall, Regreaseable Idlers, p. 2 (no date).
Superior, 81 Series—Regreaseable Idler Roll (no date).
Rexnord—Regreaseable Idler Roll (no date).
Rexnord—Rex "G" Seal Horizontal labyrinth with outer shield (no date).
Rexnord—Rex Idlers; Series C–CEMA C (no date).
Rexnord—Rex "B" Seal–Horizontal Labyrinth With Wiper (no date).

*Primary Examiner*—Christopher Verdier
*Attorney, Agent, or Firm*—Henderson & Sturm

[57] ABSTRACT

An improved one-point grease distribution system for belt conveyor idlers of a type including bearings with inner and outer races and a shaft disposed through the inner races. The shaft has an axial bore on each end thereof and at least one flow port connecting the blind end of each axial bore with the outside periphery of the shaft. A first annular seal member is disposed on each end of the shaft. A grease tube is disposed around the shaft and is sealed by the first annular seal members to the shaft at each end thereof to form a continuous grease supply passageway on one end of the shaft, through the axial bore, through the flow port, and through the space between the shaft and the grease tube to the other flow port and axial bore. A sealed reservoir is disposed on each side and through each bearing and this grease seal reservoir is defined by a back seal and a front seal. At least one small orifice is disposed in each of the first annular seal members and leads from the grease supply passageway to the grease seal reservoir for permitting grease under pressure in the grease supply passageway to enter the grease seal reservoir whereby grease flows from the supply passageway, through the orifices, through the bearings and the flowing grease pushes used grease out the front seal as it fills the grease seal reservoir with new grease.

12 Claims, 3 Drawing Sheets

ONE-POINT GREASE DISTRIBUTION SYSTEM FOR BELT CONVEYOR IDLERS

TECHNICAL FIELD

The present invention relates to an apparatus for greasing the bearings of idler rollers for troughing conveyors, and more particularly to an improved, one-point grease distribution system for belt conveyor idler rollers.

BACKGROUND ART

A common problem with one-point grease distribution systems for belt conveyor idlers is that quite often the result is that too much grease is applied to the bearings closest to the entry point of the grease to the idler assembly and not enough grease is applied to the bearings farther from the point of entry of the grease.

One such system is commonly referred to as a non-purging system which has a grease fitting for receiving the grease gun or the like on one end of one of the rollers and the opposite end of the most distant roller has a relief valve thereon which will release grease therefrom only after the grease flow chamber is completely full and pressurized to the point where the pressure overcomes the preset pressure for such relief valve. It has been found, however, that quite often while the grease has clearly gone from one end of the grease supply channel to the other, the pressure is not great enough to cause sufficient amounts of grease to actually enter the bearings. This is true even though grease has exited the relief valve. This problem will tend to worsen over time as the spring for the relief valve weakens, causing the pressure in the grease supply channel to have a maximum pressure which is less than it was when the system was initially installed.

Another one-point grease distribution system for belt conveyor idlers is shown in U.S. Pat. No. 4,174,031 to MacLeod. This shows an idler roller having a hollow shaft on which the roller rotates as well as providing a channel completely through the center thereof for the grease supply channel. Orifices are provided for communicating the hollow shaft with the grease seal reservoir which is disposed on both sides of each bearing. One of the problems with such a system is that hollow shafting is expensive as compared to solid shafting. Another problem is that hollow shafting is not as strong as solid shafting. A still further problem with hollow shafting is that the hollow shaft grease passage in the connection from one idler bearing to the next, causes a restriction which slows down the flow of grease and causes the pressure of the grease to be higher in the rollers closest to the entry point of the grease and at a lower pressure the farther away the hollow shafting is from the point of entry of the grease, thereby delivering less grease to the bearings at the more remote points and applying too much grease at the bearings closest to the point of entry of the grease into the grease supply channel.

Another type of one-point grease distribution system for belt conveyors has a rotating sleeve which is exemplified by the first embodiment shown in U.S. Pat. No. 3,198,318 to Brown. While this Brown device uses a solid shaft and overcomes some of the problems with the hollow shaft, other problems are created. For example, an additional sleeve surrounds the center of the shaft in each roller and provides flow of grease between the solid shaft and the surrounding cylinder. A problem with this type of system is that the cylinder inside of the roller actually rotates with the roller, whereas the shaft itself remains stationary. This means that the grease in the grease supply chamber has walls which rotate with respect to each other. Another very serious problem with this configuration is that especially in the cold weather when the conveyors are stopped and when they are re-started, the grease in the grease supply channel stiffens. This will cause an even greater resistance of the roller to rotation due to the presence of the hard grease in the grease supply channel because the grease supply channel walls must move with respect to each other.

Consequently, there is a need for a one-point grease distribution system for belt conveyor idler rollers which overcomes the aforementioned problems.

DISCLOSURE OF THE INVENTION

The present invention relates to an improved one-point grease distribution system for belt conveyor idlers which includes an idler roller adapted to support a portion of the conveyor belt and including a radially inwardly disposed cylindrical portion on each end thereof. A bearing is provided in each of the inner cylindrical portions, each of the bearings having an inner and outer race rotatable with respect to each other and having bearing members disposed between the inner and outer races for reducing friction when one of the inner and outer races rotates with respect to the other one. A shaft is disposed through the inner races and this shaft has an axial bore on each end thereof and at least one flow port connecting the blind end of each axial bore with the outside periphery of the shaft. A first annular seal member is disposed on each end of the shaft. A grease tube is disposed around the shaft and is sealed by the first annular seal members to the shaft at each end thereof to form a continuous grease supply passageway on one end of the shaft, through the axial bore, through the flow port, and through the space between the shaft and the grease tube to the other flow port and axial bore whereby grease can readily flow through this continuous grease supply passageway.

A sealed reservoir is disposed on each side and through each bearing and this grease seal reservoir is defined by a back seal and a front seal. At least one small orifice is disposed in each of the first annular seal members and leads from the grease supply passageway to the grease seal reservoir for permitting grease under pressure in the grease supply passageway to enter the grease seal reservoir whereby grease flows from the supply passageway, through the orifices, through the bearings and the flowing grease pushes contaminated grease out the front seal as it fills the grease seal reservoir with new grease.

An object of the present invention is to provide an improved one-point grease distribution system for belt conveyor idlers.

Another object of the present is to provide for even greasing of several bearings from one point.

Another object is to provide a practical method of maximizing the flow in the passageway connecting the bearings while minimizing the metering orifice size, thereby providing even grease flow at varying input volumes.

A further object of the present invention is to utilize a solid shaft for belt conveyor idler rollers since they are cheaper and stronger than hollow shafting.

A still further object of the present invention is to provide a grease supply passageway which does not have the walls moving with respect to each other as is the case in some of the prior art referred to above.

Other objects, advantages, novel features of the present invention will become apparent from the following detailed description of the invention when considered in conjunction with the accompanying drawings.

BEST MODE FOR CARRYING OUT THE INVENTION

Figure 1:
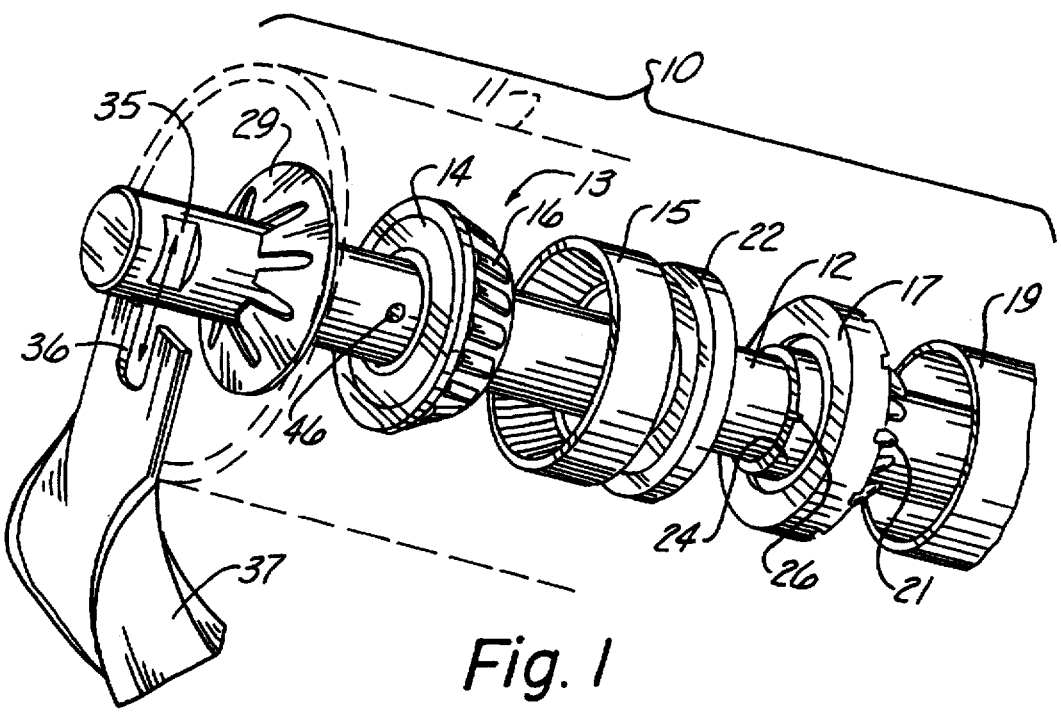
FIG. 1 is an exploded perspective view of the improved one-point grease distribution system for belt conveyor idlers of the present invention, but showing only one side of one roller and its associated bearing and grease distribution parts.

Referring now to the drawings wherein like reference numerals designate identical or corresponding parts throughout the several views, FIG. 1 shows a combination of components (10) on one end of an idler roller (11), it being understood that there is a bearing and set of components (10) on each end of the shaft (12) for each idler roller (11).

The shaft (12) has a conventional bearing (13) disposed on each end thereof and the bearing (13) includes an inner race (14) an outer race (15) and roller bearings (16) which reduce friction between rotation of the inner and outer races (14) and (15) respectively. A seal member (17) has an annular groove (18) therein in the base portion thereof which can readily be seen in FIG. 5 for providing an interference fit with the end of the grease supply tube (19). Longitudinal projections (21) are integrally formed in the seal (17) and these projections (21) fit tightly around the shaft (12) in a press fit relationship. A tapered cam wall surface (21a), shown in FIG. 5, guides one end of the grease tube (19) into the annular groove (18) during the assembly process. An annular back seal (22) has an inner sealing lip (23) thereon which seals tightly against the ring portion (24) of seal (17) when the grease in seal reservoir (25) is high. The ring portion (24) of seal (17) is in sealing contact with shaft (12) and also has a pair of opposed metering slots (26) therein and these metering slots are disposed between two of the projections (21). Their purpose will be explained below.

Figure 2:
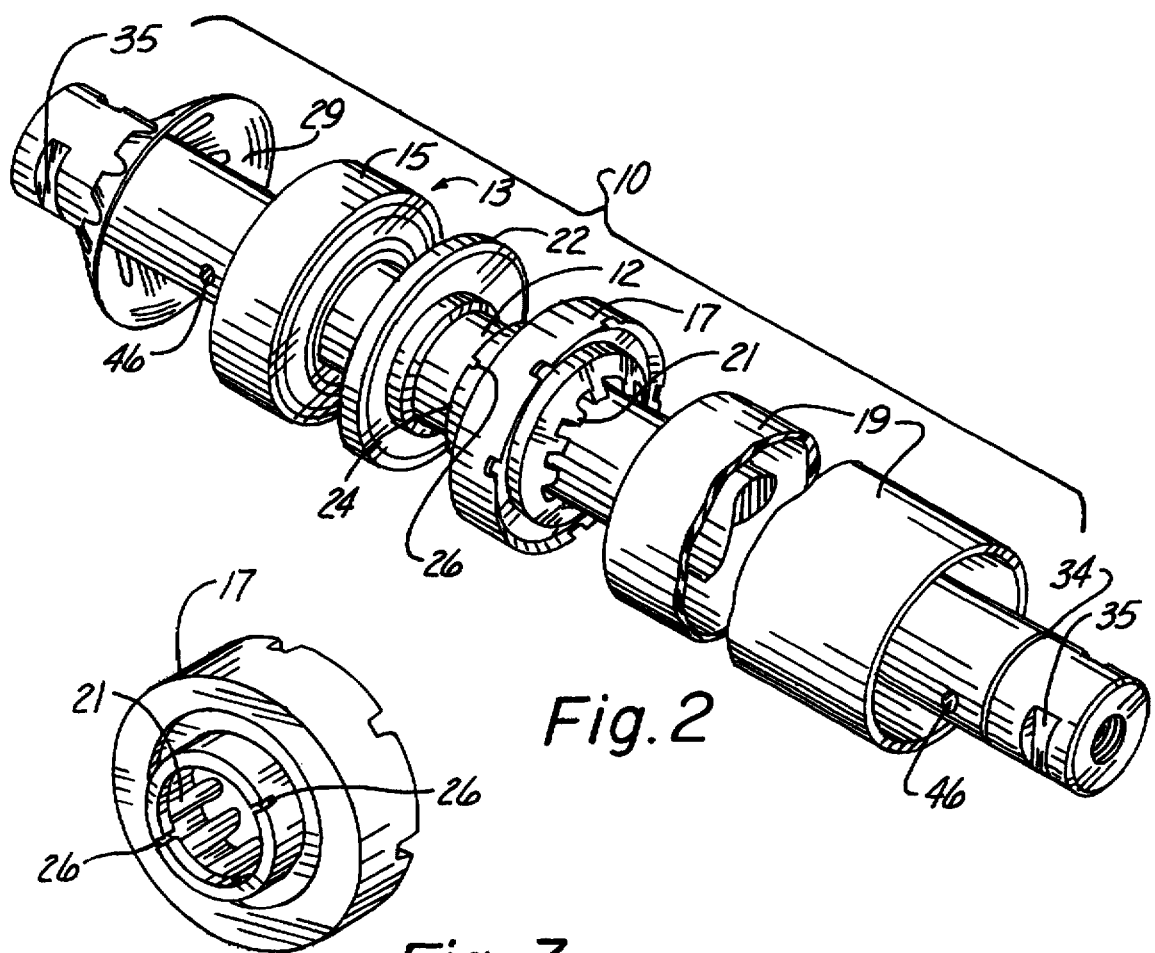
FIG. 2 is a perspective exploded view of the solid shaft and the associated bearing and grease distribution parts for one side and a portion of the middle of one idler roller.
Figure 3:
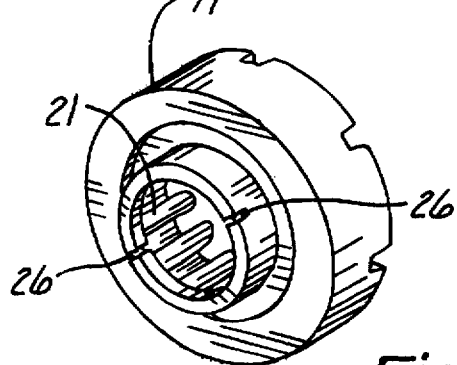
FIG. 3 is a perspective view of an annular seal member disposed on each end of the shaft for allowing grease to flow from the flow port on the shaft to the grease supply tube and also to provide metering slots for allowing controlled amounts of grease to enter the seal reservoir disposed around each bearing.
Figure 4:
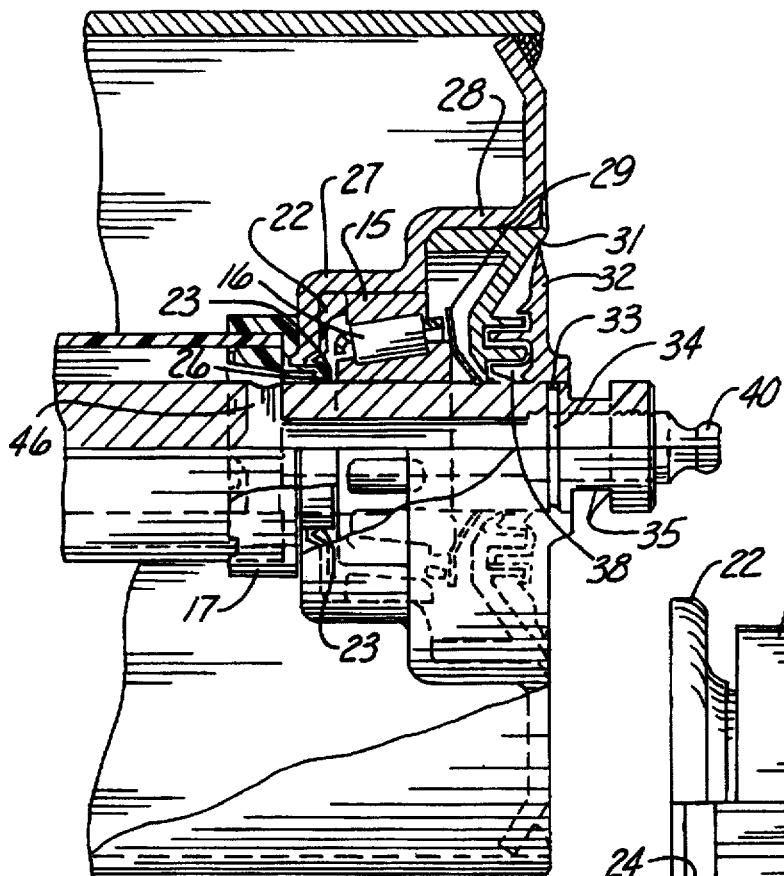
FIG. 4 is a partial cross sectional view of one end of one idler roller.
Figure 6:
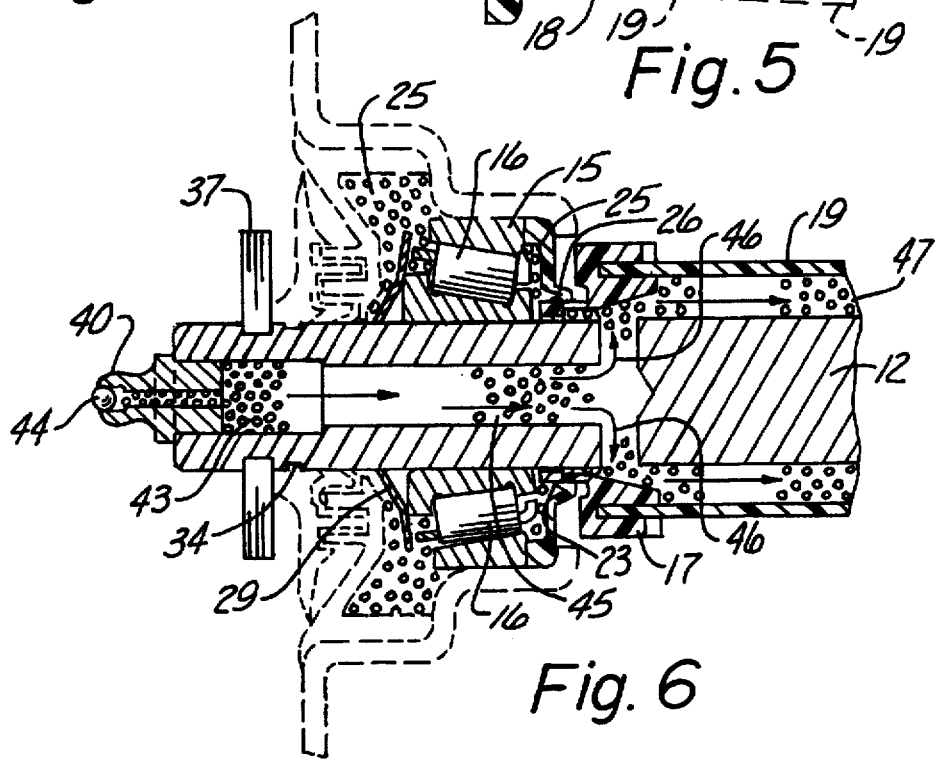
FIG. 6 is a cross sectional view taken along line 6—6 of FIG. 7 showing the flow of grease from the point of entry into the solid shaft and to the supply tube and further through the metering orifices to the grease seal reservoir disposed around and through each bearing.

Referring now to FIGS. 4 and 6, it is noted that the roller (11) has an inner cylindrical wall (27) and an intermediate cylindrical wall (28). All of the parts shown in FIGS. 1 and 2 can be put on at one time by pushing on the spring steel push nut (29), thereby pushing the bearing (13), the race (15), the back seal (22) and the seal (17) on the shaft (12) to the appropriate place shown in FIGS. 4 and 6. After that is done, a male labyrinth (31) is pushed into the opening formed by intermediate cylinder (28) and a female labyrinth seal (32) is pushed into the place shown in FIG. 4 so that an annular extension (33) extends into an annular groove (34) in the shaft (12). This causes a restriction to the flow of old grease between male labyrinth (31) and female labyrinth (32). This restriction creates a back pressure in grease chamber (25) which pushes seal (22) in sealing contact with ring portion (24).

Flat spots (35) are formed on the shaft (12) so that it can be received in a groove (36) in support member (37) shown in FIG. 1 whereby the shaft (12) will be held from rotating while the outer idler roller (11) can rotate. A purgeable seal (38) extends completely around the shaft (12) and allows dirty grease to exit therethrough when chamber (25) is under high pressure and when new grease is pushed in through the orifices (26) in the seal (17).

Figure 7:
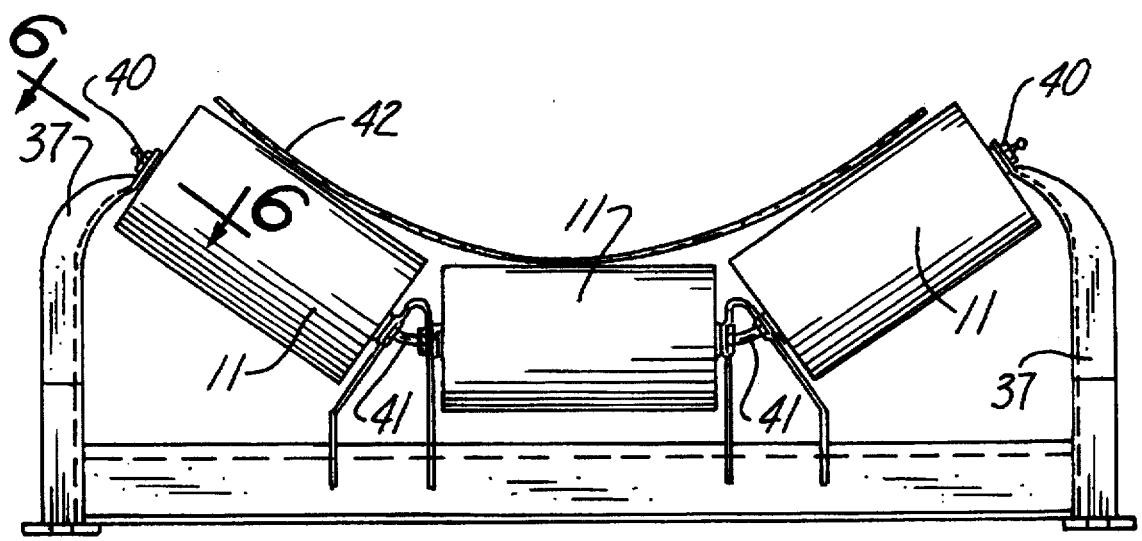
FIG. 7 is a view of a typical arrangement of three rollers supporting a conveyor belt and forming a troughing conveyor.

In operation, the idlers (11) are shown in FIG. 7, with conveyor belt (42) thereon, and wherein each of the idlers has a connection (41) between the open passageway (43). The exterior of passageway (43) has a grease fitting (40) therein as shown in FIG. 6. The connections (41) are nylon tubes which extend into passageways (43) in adjacent solid shafts (12). A grease gun (not shown) will push grease past the ball (44) and into the passageway (43) in the direction of the arrows shown in FIG. 6. The opening (43) is restricted partially at section (45) and then leads into ports (46) which have been formed by boring completely through the shaft (12) to form radial bores therein. These openings (46) are not metering openings, but are intended to allow the flow of grease into a grease supply passageway (47) between solid shaft (12) and the grease tube (19).

Once the grease entering through fitting (40) in FIG. 6 completely fills the grease supply channel between all of the shafts (12) and tubes (19) and all of the passageways (43) and (45) on each end of each shaft (12), the grease will start to build up a higher pressure as additional new grease is pushed in through the fitting (40). This higher pressure will force grease flow through the metering orifices (26) leading to the seal reservoir (25), which extends on both sides of the bearing member (16), it being understood that grease can flow past the bearing member (16).

Figure 5:
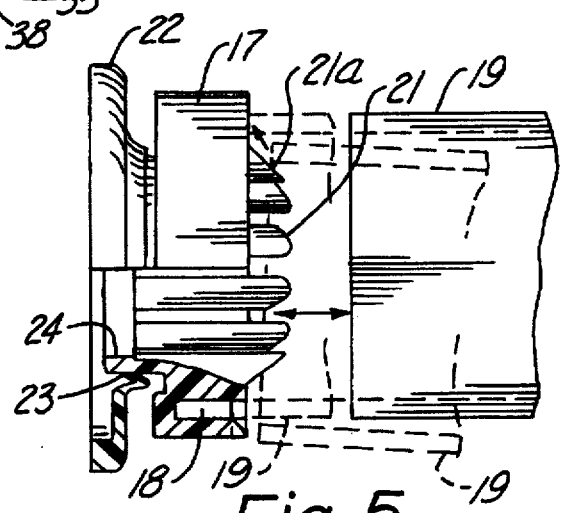
FIG. 5 is a side and partial cross sectional view of the annular seal and back seal and showing how the grease tube automatically is guided into an annular groove during the assembly process.

Because all of the small metering orifices (26) restrict the flow much more than does the large tube (19), all of the grease supply passageway is essentially at the same pressure, therefore all of the bearings (13) will be simultaneously and uniformly greased by adding new grease to the grease seal reservoir (25) through fitting (40). Ideally, this greasing is continued until the old grease is pushed past the purgeable contact seal (38). This higher pressure in the seal reservoir (25) pushes against the lip (23) of back seal (22) as can be seen in FIGS. 5 and 6 to form a better seal the higher this pressure becomes. The rollers (11) are free to rotate with the outer race (15) and back seal (22) rotating with the roller (11) whereas the shaft (12), seal (17) and tube (19) will remain stationary. The metering orifices (26) can be replaced by a slot (not shown) in the shaft (12) under ring (24).

Accordingly, it will be appreciated that all of the objects identified above have been accomplished in the preferred embodiment and that the problems referred to in the Background of the Invention have been overcome. For example, the grease tube (19) can be formed of 200 PSI PVC plastic tubing and is very inexpensive so that the total cost, including solid shafting, is significantly less than the cost of hollow shafting.

Obviously, many modifications and variations of the present invention are possible in light of the above teachings. It is therefore to be understood that, within the scope of the appended claims, the invention may be practiced otherwise than as specifically described.

We claim:

1. A belt conveyor idler mechanism comprising:
   (a) an idler roller adapted to support a portion of a conveyor belt, the idler roller including a radially inwardly cylindrical portion on each end thereof;
   (b) a bearing disposed in each of said cylindrical portions, each of said bearings having an inner and an outer race rotatable with respect to each other and having moveable bearing members disposed between the inner and outer races for reducing friction when one of the inner and outer races rotates with respect to the other one;
   (c) a shaft disposed through said inner races, said shaft having an axial bore in each end thereof; said axial bores each having a blind end and at least one flow port connecting the blind end of each axial bore with the outside periphery of the shaft, said shaft being a non-rotating part;
   (d) a first annular seal member disposed on each end of the shaft, said first annular seal being a non-rotating part;
   (e) a grease tube disposed around the shaft and sealed by said first annular seal member to the shaft at each end thereof to form a continuous grease supply passageway from one end of the shaft, through one of the axial bore, through one of the at least one flow ports, and through a space between the shaft and the grease tube to the other at least one flow port and axial bore whereby grease can freely flow through said continuous passageway;
   (f) an annular back seal located at each end of the idler roller which respectively seals between one of the radially inwardly cylindrical portions of the idler roller and one of the non-rotating parts of the grease passageway; and
   (g) orifice means leading from the grease supply passageway to the bearings for creating pressure while permitting grease under pressure in the grease supply passageway to enter the bearings, whereby grease flows from the grease supply passageway, through the orifice means and through the bearings.

2. The mechanism of claim 1 including means for keeping the shaft and the tube from rotating with respect to each other.

3. The mechanism of claim 1 wherein the shaft is solid between the hollow-end end portions formed by the axial bores and the flow ports.

4. The mechanism of claim 1 further including plural idler mechanisms and means for connecting the grease supply passageway of one belt conveyor idler mechanism to an adjacent belt conveyor idler mechanism whereby grease can be supplied to said one belt conveyor idler mechanism and such grease will also flow to the grease supply passageway of the adjacent belt conveyor idler mechanism.

5. The mechanism of claim 1 wherein said first annular seal member comprises:

a base portion;

annular groove means attached to said base portion for receiving one end of the grease tube; and a plurality of spaced apart projections attached to the base portion, each of the projections having a longitudinal axis generally parallel to the longitudinal axis of the shaft and grease tube, each respective flow port being disposed on the exterior of the shaft at approximately a place that the projections contact the shaft whereby grease can pass between the projections as it passes into the grease tube.

6. The mechanism of claim 5 including a tapered cam wall surface disposed between the annular groove means and the projections for automatically guiding one end of the grease tube into the annular groove during an assembly process.

7. The mechanism of claim 5 wherein the base portion includes a ring in sealing contact with the shaft and said orifice means is an orifice formed between a projection in the inner periphery of the ring and the shaft.

8. The mechanism of claim 7 wherein the orifice is disposed between adjacent projections.

9. The mechanism of claim 8 including means for causing the pressure of grease in respective grease seal reservoirs to enhance the sealing of the respective seals back said pressure causing means comprising an annular lip on each said respective back seal, said annular lip being in contact with the exterior periphery of the ring thereby impeding flow therethrough and thereby creating said pressure in the grease seal reservoirs.

10. The mechanism of claim 9 including means for sealing the radially outer periphery of each respective back seal against the outer race of each respective bearings.

11. The mechanism of claim 1 further including a reservoir disposed on each side of and through each bearing, each said reservoir being disposed between one of said annular back seals on one side the bearing and a front seal which seals from one end of the idler roller to the shaft on the other side of the bearing.

12. A belt conveyor idler mechanism comprising:
   (a) an idler roller adapted to support a portion of a conveyor belt, the idler roller including a radially inwardly cylindrical portion on each end thereof;
   (b) a bearing disposed in each of said cylindrical portions, each of said bearings having an inner and an outer race rotatable with respect to each other and having moveable bearing members disposed between the inner and outer races for reducing friction when one of the inner and outer races rotates with respect to the other one;
   (c) a shaft disposed through said inner races, said shaft having an axial bore in each end thereof, said axial bores each having a blind end and at least one flow port connecting the blind end of each axial bore with the outside periphery of the shaft;
   (d) a grease tube disposed around the shaft to form a continuous grease supply passageway from one end of the shaft, through one of the axial bores, through one of the at least one flow ports, and through a space between the shaft and the grease tube to the other at least one flow port and axial bore whereby grease can freely flow through said continuous passageway;
   (e) means for sealing each end of the grease tube to the shaft at a place between the respective flow port and the respective bearing;
   (f) means for providing a grease reservoir disposed on each side of and through each bearing, each said grease reservoir being defined by:
      (1) an annular back seal means for sealing between one of the respective radially inwardly cylindrical portions of the idler roller and one of said respective sealing means on one side of each bearing; and
      (2) a front seal means for sealing from one end of the idler roller to the shaft on the other side of each bearing; and (g) orifice means leading from the grease supply passageway to the grease reservoirs for permitting grease under pressure in the grease supply passageway to enter the grease reservoirs whereby grease flows from the grease supply passageway, through the orifice means, through the bearings, and the grease flow pushes contaminated grease out the front seal means as it fills the grease reservoirs with new grease.

* * * * *